United States Patent
Bender

(10) Patent No.: US 10,280,894 B1
(45) Date of Patent: May 7, 2019

(54) WAVE POWERED ELECTRIC GENERATOR DEVICE, SYSTEM AND METHOD

(71) Applicant: Andrew L. Bender, Ambler, PA (US)

(72) Inventor: Andrew L. Bender, Ambler, PA (US)

( * ) Notice: Subject to any disclaimer, the term of this patent is extended or adjusted under 35 U.S.C. 154(b) by 428 days.

(21) Appl. No.: 14/943,484

(22) Filed: Nov. 17, 2015

Related U.S. Application Data

(60) Provisional application No. 62/080,687, filed on Nov. 17, 2014.

(51) Int. Cl.
F03B 13/16 (2006.01)
F03B 13/14 (2006.01)

(52) U.S. Cl.
CPC ............ F03B 13/16 (2013.01); F03B 13/141 (2013.01)

(58) Field of Classification Search
CPC ...... Y02E 10/38; F03B 13/20; F03B 13/1885; F03B 13/18; F03B 13/16; F03B 13/12
USPC ...................................... 290/42, 53
See application file for complete search history.

(56) References Cited

U.S. PATENT DOCUMENTS

| | | | | |
|---|---|---|---|---|
| 3,415,317 A | * | 12/1968 | Drivet | E21B 7/12 166/336 |
| 7,184,363 B2 | * | 2/2007 | Szegedi | B63B 22/24 367/3 |
| 2004/0061338 A1 | * | 4/2004 | Woodbridge | F03B 13/1845 290/53 |
| 2005/0121915 A1 | * | 6/2005 | Leijon | F03B 13/1885 290/42 |
| 2006/0208839 A1 | * | 9/2006 | Taylor et al. | 335/205 |
| 2006/0280605 A1 | * | 12/2006 | Budi | F03B 17/065 416/84 |
| 2007/0132246 A1 | * | 6/2007 | Hirsch | F03B 13/1845 290/42 |
| 2007/0228736 A1 | * | 10/2007 | Smushkovich | F03B 13/1845 290/42 |
| 2008/0309088 A1 | * | 12/2008 | Agamloh | F03B 13/1845 290/53 |
| 2009/0212562 A1 | * | 8/2009 | Jaugilas | F03B 13/26 290/42 |
| 2010/0084868 A1 | * | 4/2010 | Shin | F03B 13/1865 290/53 |
| 2010/0107627 A1 | * | 5/2010 | Morgan | B63B 35/44 60/495 |
| 2010/0117366 A1 | * | 5/2010 | Rhinefrank et al. | 290/53 |
| 2010/0219633 A1 | * | 9/2010 | Sichau | F03B 13/1855 290/42 |
| 2010/0283261 A1 | * | 11/2010 | Ryan | F03B 17/04 290/1 R |

(Continued)

Primary Examiner — Tulsidas C Patel
Assistant Examiner — Thomas K Quigley
(74) Attorney, Agent, or Firm — Fox Rothschild LLP

(57) ABSTRACT

The present invention relates, in part, to a wave powered electrical generator having a core electrically generating component that spins in one direction with the rise and fall of a wave. In certain aspects, it includes an apparatus, system, and method for converting wave energy into electricity. The apparatus includes a housing; an inner core within the housing that rotates in at least one direction; a first set of electrically conductive wire coils coupled to a peripheral wall of the inner core; a second set of electrically conductive wire coils adjacent to the inner core; a plurality of sliding elements coupled to a housing wall and slidable along a least a portion of the housing wall; and a buoy coupled to the sliding elements on an external side of the housing.

4 Claims, 10 Drawing Sheets

(56) References Cited

U.S. PATENT DOCUMENTS

| | | | |
|---|---|---|---|
| 2011/0221209 A1* | 9/2011 | Ryan | F03B 17/02 290/1 R |
| 2012/0235413 A1* | 9/2012 | Piccinini | F03B 13/1865 290/53 |
| 2012/0247098 A1* | 10/2012 | Stewart | F03B 11/00 60/501 |
| 2012/0248774 A1* | 10/2012 | Stewart | F03B 13/20 290/53 |
| 2015/0176562 A1* | 6/2015 | Nozawa | F03B 13/186 290/53 |
| 2015/0275847 A1* | 10/2015 | Sung | F16D 43/208 74/37 |
| 2016/0248311 A1* | 8/2016 | Isbell | H02K 35/00 |

* cited by examiner

US 10,280,894 B1

WAVE POWERED ELECTRIC GENERATOR DEVICE, SYSTEM AND METHOD

CROSS-REFERENCE TO RELATED APPLICATIONS

This application claims the benefit of U.S. Provisional Application No. 62/080,687, filed on Nov. 17, 2014, the contents of which are incorporated herein by reference.

FIELD OF THE INVENTION

The present invention relates to the field of clean energy production, specifically the use of water waves to generate electricity.

BACKGROUND

Commercial electricity is typically generated by turbines driven by steam. Sources of heat to produce this steam include burning fossil fuels and nuclear fission. However, both of these methods of producing electricity involve significant environmental risks. Consequently, there is a need for renewable, pollution free alternatives to fossil and nuclear fuels. Additionally, most current clean energy alternatives such as wind power have come under fire for being too large, noisy, being an eyesore, or for killing wildlife, with people along the coasts and elsewhere complaining about their installation.

One such environmentally sound method without these drawbacks is the use of ocean or other body of water's waves to generate electricity. More particularly, it is known to convert the mechanical energy of oscillating ocean waves into electricity via an electric generator. Examples of such applications include those of U.S. Pat. Nos. 7,319,278; 5,066,867; 5,176,552; 7,245,041; 6,695,535; 4,340,821; 4,242,593; 4,228,360, and U.S. Application No. 2004/0061338, which all disclose methods of converting ocean wave power into electricity. These patents and patent applications, however, disclose buoys which will float away to the furthest extent of their cables, leaving the devices unable to generate significant amounts of power. Additionally, some of these patents leave the devices open to corrosion and damage from sea life, and unable to withstand the forces of hurricanes, storms and other events. They also can not move with relation to the average height of the surface of the water to reduce stress on the devices during extreme weather events or water level rise due to global warming. The devices do not have warning lights to warn ships away, nor do they have highly visible coatings to protect them from the elements and to warn away wildlife. The above patents also do not disclose the use of a plurality of generators per device which all work on both the rise and fall of each wave, which would significantly increase their efficiency. If using only a single generator, these devices cause gears to turn, which turn either a flywheel or generator downstream. All these devices have multiple gears, clutches, separate flywheels, and other similar devices, all of which reduce the efficiency of the system.

U.S. Pat. No. 5,176,552, for example, discloses methods of converting ocean wave power into electricity using a buoy and a metal disk which creates drag as the buoy rises. This motion causes a pull on a string, which stretches a spring to turn gears for electrical generation. As the first wave rises, the drag may create some energy, but the disc must fall all the way back down to get much energy out of the next wave, which is unlikely. This creates an energy loss in the system and reduces its efficiency. Secondly, the length and strength of the spring takes even more energy out of the system as the wave must first travel the length of the spring before imparting any energy to the device. The strength of the spring, which will lessen over time, also drastically limits the amount of energy that can be generated. Additionally, it does not use gravity as a counterweight, greatly reducing efficiency. Finally, the embodiments of this patent only generate energy as a wave rises, not as it falls, leaving only part of half of the wave to generate electricity which is extremely inefficient.

U.S. Pat. No. 4,159,427 uses propeller blades to convert a fluid flowing in a preferred direction into electricity. This means that the fluid must be traveling in the preferred direction in order to gather that energy.

U.S. Pat. No. 3,818,704 converts surface waves into electricity by spinning a float positioned on the surface of a body of water. It requires that the float be mounted on the surface of the water, exactly at the height of the top of the waves. Since the height of waves differ depending on a variety of factors, it is unlikely to gather much energy at all, especially depending on the height of the tide. What energy the invention in U.S. Pat. No. 3,818,704 does gather is also reduced by the gears it must turn in order to turn the generator.

U.S. Published Patent Application No. 2009/0072540 does use both upward and downward motion of waves to generate electricity. However, the electricity is generated using gears, which significantly reduces the amount of energy transmitted to the generator(s). It also uses two different generators, one in the up direction, one in the down direction to generate electricity which stops all momentum at the top and bottom of each wave, reducing efficiency, and therefore and electricity produced. U.S. Published Patent Application No. 2009/0072540's single-generator design is also open to the elements which make it extremely vulnerable to corrosion and sea life growing on it, preventing the gears from turning. It also does not use gravity as a counterweight, reducing efficiency.

To this end, there is a need for a wave powered electricity generating device that is able to maximize capture of energy from a wave while minimizing energy loss from design shortcomings.

SUMMARY

In certain non-limiting aspects, the present invention includes an apparatus for converting wave energy into electricity comprising; a housing; an inner core contained within the housing that is adapted to rotate in at least one direction; a first set of electrically conductive wire coils coupled to a peripheral wall of the inner core (acting as a stator); a permanent magnet, or combination of permanent magnet and electromagnet, or an electromagnet in a coil of electrically conductive wire creating the electromagnet having teeth surrounding it acting as a rotor such that, as the inner core rotates the electromagnetic coils move past the first set of wire coils, generating electricity in the inner core; a plurality of sliding elements coupled to a housing wall and slidable along a least a portion of the housing wall; and a buoy coupled to the sliding elements on an external side of the housing.

The sliding elements may include a first sliding portion and a second sliding portion, where the first sliding portion comprises a first magnet and is provided on an exterior side of the housing and the second sliding element comprises a second magnet having a polarity that is opposite to the first magnet, wherein the second magnet is provided in an interior side of the housing. In such embodiments, the sliding element slides along a track of the housing having a plurality of ball bearings such that the sliding element slides along the ball bearings as it moves along the track.

Such an embodiment of the present invention may also include at least one rod coupled to and extending between the sliding elements to support a mass, and pull on one or more cables to spin a generator/flywheel.

In further aspects, a first cord may be coupled to a first sliding element and a first rotational disk, wherein the first rotational disk is engageable with a portion of the inner core at a first position to rotate it in a direction during a rise of a wave; and a second cord coupled to a second sliding element and a second rotational disk, wherein the second rotational disk engageable with a second portion of the inner core at a section position to rotate the inner core in the same direction as the first rotational disk during a fall of a wave. The first and second discs may retractably engage the cord.

In further, or alternative, embodiments, the present invention includes a method for converting wave energy into electricity comprising; providing an apparatus comprising a housing; an inner core contained within the housing that is adapted to rotate in at least one direction; a first set of electrically conductive wire coils coupled to a peripheral wall of the inner core; a second set of electrically conductive wire surrounding the inner core creating an electromagnet such that, as the inner core rotates the second set of wire wrapping spins near the first set of wire coils, generating electricity in the inner core; a plurality of sliding elements coupled to a housing wall and slidable along a least a portion of the housing wall; and a buoy coupled to the sliding elements on an external side of the housing, wherein as the buoy rises with a wave, it causes the sliding element to rise along the housing and causes the rotation of the inner core such that the second set of wire wrapping rotates past the first set of wire coils in a first direction, thus generating electricity, as the buoy falls with a passing wave, it causes the sliding element to fall along the housing such that the second wire wrapping rotates past the first set of wire coils in the first direction, thus generating electricity.

In further, or alternative embodiments, the present invention includes an apparatus for spinning a rotor/flywheel in one direction comprising; a one-way spinning rotor having an internal spring which, when a cord is pulled, causes a lever to engage a ratchet, and extend a tooth which engages either the top or the bottom of a rotor/flywheel, spinning it in one direction.

In even further, or alternative embodiments, the present invention includes an apparatus for restricting the movement of a buoy such that a tide or current does not move it to the furthest extent of its cable, preventing any power generation, comprising; a hollow tube that encloses a buoy and prevents lateral movement, the tube being supported by a plurality of floats, the bottom of the tube being attached to the sea/ocean floor by a plurality of cables, which may be adjustable in length to reduce damage in case of large waves or water level rise by tension adjusting ratchets (cable housings).

In even further, or alternative, embodiments, the present invention includes an apparatus for converting wave energy into electricity comprising; a housing; a plurality of floats surrounding the housing; and a plurality of rods attached to the floats which pass through the housing at pivot points that are sealed from an exterior side of the housing. The rods may be attached to cables or ziplines which pass over pulleys, and are attached to heavy masses on the other end so that the mass can be used to pull opposite the direction of the wave rising. Ziplines or cables may pass through at least one two-way generator which spins a generator/flywheel in one direction regardless of the cable or zipline's rise or fall, increasing its speed on both the rise and fall of each wave, constantly generating electricity. Such embodiments may also include a water sensor, a battery, tension adjusting ratchets at the bottom of the body of water and wires leading to and from the ratchets from the housing and connecting one ratchet to another so that the ratchets can receive power and communicate with one another. The present invention may also include an EM receiver/transmitter with wires leading to an antenna near the top of the generator so that they can receive external commands or encrypted external commands, and transmit information on their status either wirelessly or wired in the cable that returns to shore or to a power station among other non-limiting examples.

BRIEF DESCRIPTION OF THE FIGURES

FIGS. 9*a* and 9*b* show one embodiment of floating cylinders with one or a plurality of outstretched arms with buoys attached to the ends. The arms pass through watertight gaskets which allows the arms to pivot up and down, over a plurality of pulleys, through a plurality of generators, and with a plurality of masses attached to their ends so each generator can generate electricity on both the rise and fall of each wave.

FIGS. 10*a* and 10*b* show one embodiment of the cable housings which let out and take in cable depending on the tension on the cables, on weather events, and on external EM commands which may be encrypted to keep the cylinder at a constant height relative to the average body of water level, and to release cable in case of emergencies such as a violent storm or a tidal wave, etc.

DETAILED DESCRIPTION

The present invention relates, in part, to a device, system, and method for efficiently capturing wave energy from a body of water and converting it into electricity. In certain non-limiting aspects, the certain embodiments of the device, system and method are free of or substantially free of any gears (or similar components) that would or could reduce the transfer of energy from the wave. In further aspects, the present invention is provided in an enclosed housing that minimizes its exposure to harsh environmental conditions. This is important in extending the life of the present invention compared to similar inventions that are open to the elements. In aspects of the present invention, nearly all of the energy of each wave, both rising and falling, is transferred to the core, which acts as both a generator, and also acts as a flywheel. By minimizing the ability of the flywheel/generator to stop spinning and by simplifying the number of components and reducing the use of components that lead to energy waste, the present invention is able to generate significant amounts of electricity.

Other embodiments of the present invention minimize the number of one-way gears needed to convert both the rise and fall of each wave into electricity, and to prevent a buoy from floating away from the device to such an extent as to make it unusable.

The cables attaching the embodiments of the present invention (if any, and as discussed below) to the floor of a body of water may be released from a housing which either takes the average tension on the line for a predetermined amount of time, and calculates if more cable should be released in conjunction with the other cable housings, or uses other algorithms to determine how much cable to release or take-in, or will take in or release more cable when commanded to by EM waves or encrypted EM waves. It will also transmit its status or any damage back to shore either by a data cable with the power cable, or by antenna. In certain embodiments, the rise and fall of the buoy transfers motion to the inside of a watertight housing, where it is utilized and converted into electricity.

In certain embodiments, a base of the housing is filled with cement or a similar material to provide ballast so it will submerge, at least partially, under the water. It may be either tethered to the body of water's floor via a plurality of cables or cement, wood, or metal pylons among other materials, so it stays stationary compared to the surface of the body of water. It may have either a flashing light (e.g. an LED light) on top to warn ships away, or one of a cluster of these devices will power one or a plurality of warning lights at the center, perimeter, or elsewhere on the cluster.

Figure 1:
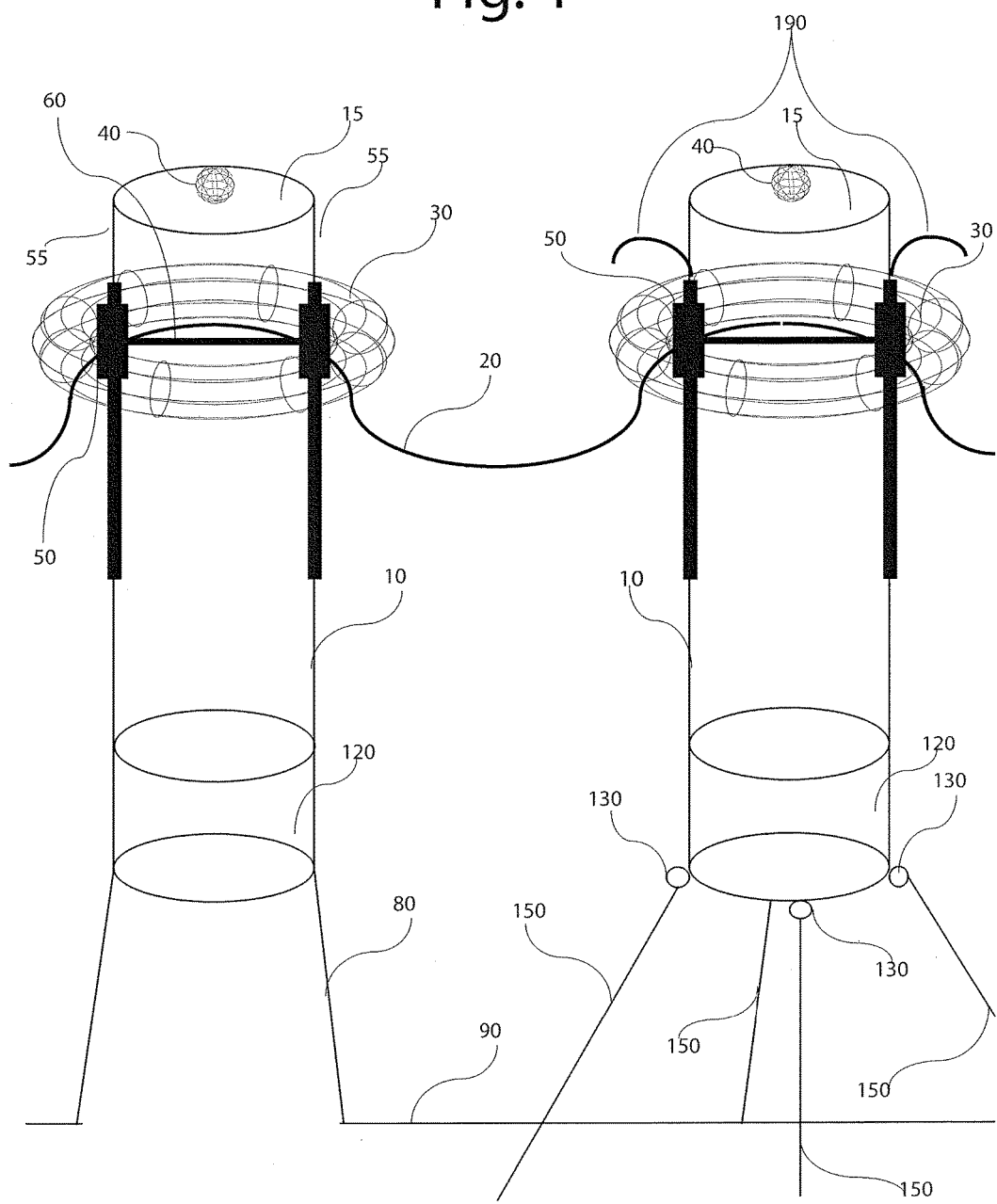
FIG. 1 shows one embodiment of a cylindrical housing of the present invention attached to the body of water's floor via cement, composite materials, metal, wood, cables or similar materials. It also shows the tarus-shaped flotation device or buoy. The buoy is attached to a series of sliders which are connected to the inside of the cylinder by strong permanent magnets. A plurality of curved buoy stops are on top of the device to prevent the buoy from coming off.

Referring to FIG. 1, in certain aspects, the present invention includes a housing component 10. The housing component is illustrated in this embodiment as having a cylindrical shape, but the present invention is not limited to this design and similar or alternative shapes may be used. The housing may also be of any size, but in certain embodiments is of a size sufficient to entirely encapsulate the present invention, as demonstrated in the figure. The housing component may be made from any material adaptable to accomplish the objectives herein, particularly one or a combination of components able to withstand the repeated force of waves and harsh environmental conditions. Non-limiting examples of such materials include fiberglass, carbon, or other fibers, metals (such as aluminum), alloys or composite metals, or other similar materials or combinations of materials.

As illustrated in FIG. 1, the housing 10 may be at least partially submerged beneath the waves 20 of a body of water, such as an ocean. It has a removable watertight lid 15. A tams or other shaped buoy/float 30 surrounds the housing 10 and is attached to sliders 50 and their guide rails 55. The sliders 50 and guide rails 55 are coupled to support rods 60 inside of the housing 10 and transfer the motion of a wave from the buoy 30.

One or a series of flashing lights 40 (such as LED lights) may be optionally provided on a top surface of the housing 10 as a signal for boat traffic or the like. These lights may be battery powered or may be powered by the electricity generated in the device, as discussed in greater detail below. The base of the housing 10 may be secured to the floor of the water body or may be otherwise designed to minimize motion (e.g. rocking) as a wave passes. In certain aspects, it is attached to the floor 90 of a body of water by cement, metal, wood pylon or other material base 80. For example, a material such as cement fills a base 120 of the housing 10 to keep it submerged. A second material 80, which may be the same as the material of ballast 120 then couples base 10 to the floor 90.

Another possibility for support is a plurality of cables 150 attached to the base of housing 10. Each cable may be attached using any method known in the art. In certain aspects, the cables 150 are attached via rings 130, which may be welded or attached using any other means to the base of the housing 10 containing ballast material 120. In certain embodiments, the cables 150 may be releasable from, extendable from, or retractable from a cable housing 625, as referred to in FIG. 9. An aspect of the housing, for example, may calculate the average tension on the line over a given amount of time. If the tension exceeds a certain number, say, due to ocean or a body of water's level rise, the aspects of the housings will all, at a coordinated time, let out a given amount of cable, reducing the tension on the cable 150.

Alternatively, the cable housing can release or retract cable when commanded by an EM wave. Cable 150, housing 10 and cable housing 625 may also be made of or coated with a highly visible color such as a florescent or luminescent one so animals can more easily avoid them. In certain embodiments, the cable 150, housing 10 and cable housings 625 may also be coated with an automotive paint and/or lacquer or other coatings or coatings in patterns that inhibit the attachment of organisms, layered a plurality of times, thus reducing or preventing the growth of organisms on the embodiments.

In certain embodiments, the housing 10 may also include one or a plurality of curved buoy-stoppers 190. This may be provided as being coupled to the upper portion of the housing 10 to prevent the buoy 30 from floating off of the housing 10. In certain preferred embodiments, the housing walls are sealed such that the components discussed herein are removed from environmental elements.

Figures 2A, 2B, 2C, 2D, 2E:
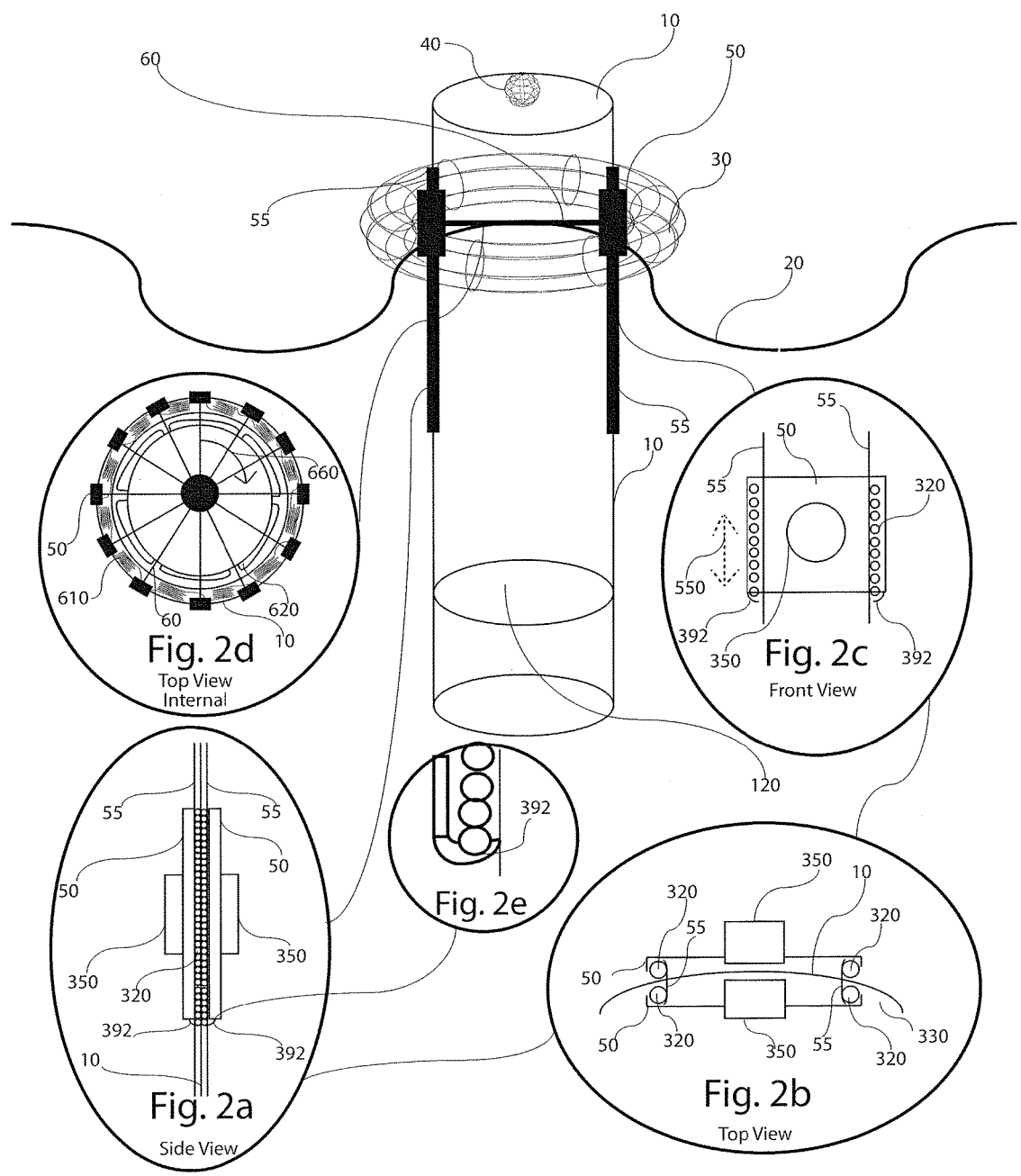
FIGS. 2a, 2b, 2c, 2d and 2e show one embodiment of the sliders which surround the cylinder and magnetically transfer the wave motion to the inside of the cylinder. It also shows the top of the inner core (the top of the rotor and stator) the rotor spins clockwise, generating electricity.

In one embodiment, FIG. 2 illustrates a cylindrical watertight housing 10 with a removable watertight lid, and flashing LED light 40 on top. The buoy 30 is coupled to sliders 50, which attach magnetically to inner support rods 60. FIG. 2a illustrates a closer view of the magnetic sliders 50 which slide up and down along rails 55. As illustrated, the sliders include a component on an interior side and exterior side of the housing 10, which are coupled together via magnets 350. That is, the magnet on the interior side of the housing 10 and on the exterior side of the housing 10 have opposite polarity and are attracted to each other. Thus, when one side of the slider moves, the other side moves as well.

In certain non-limiting aspects, the sliders 50 are adapted to move along the longitudinal axis of the rails 55 using a plurality of ball bearings 320. These ball bearings are provided in a line parallel to the longitudinal axis of rails 55 and are supported at one or both ends by supports 392, which keep the ball bearings in place and prevent them from falling. The present invention is not limited to the use of ball bearings, however, and any similar design may be used to facilitate the fluid motion of the sliders 50 along the axis of the rails 55, as provided above. FIG. 2b illustrates a top view of the development in FIG. 2a with magnets 350 connecting the inside of the housing 330 with the outside 10. The rollers roll along tracks 55, using ball bearings 320, which are held in place by the roller housing 50 and tracks 55.

FIG. 2c illustrates a front view of the development in FIG. 2a using magnet 350 to transfer the wave motion to the inside of the cylinder. The roller moves up and down (550) using guide rails 55. The ball bearings, 320, are supported by supporting rollers 392. FIG. 2e illustrates the supporting rollers 392 supporting a stack of ball bearings and allowing the sliders 50 to roll freely and with very little friction.

FIG. 2d illustrates the top inside of the housing 10 with sliders 50 of the housing, wherein the energy of a wave is transferred using the rotation of an internal core (rotor) 620 and rods 60. As with the above, the sliders 50 are coupled to support rods 60 which support an inner generator core 620 and which spins in direction 660 with the rise and fall of each wave. As discussed in greater detailed below, electrically conductive wire coils (such as copper) are used in a stator 610 to generate electricity as the inner core 620 spins in direction 660.

Figure 3:
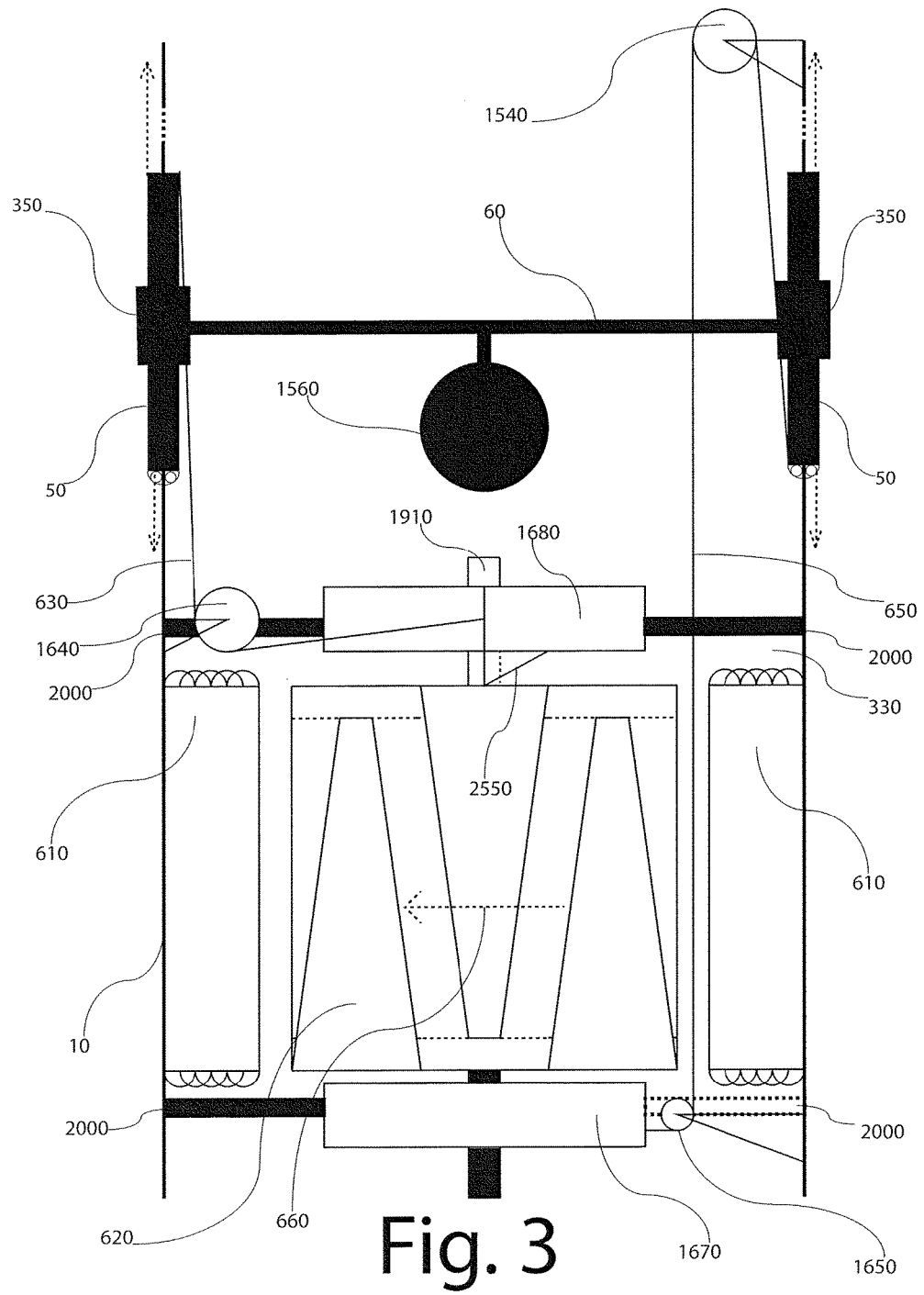
FIG. 3 shows one embodiment of the inner core (rotor), the inner sliders connected to the outer sliders by magnetic fields, and the pulleys and accelerators above and below the rotor. It also shows the copper wire surrounding the inside of the housing which acts as the outer part of an electric generator (the stator).

FIG. 3 illustrates a side-view perspective of the embodiment in FIG. 2d. More specifically, it illustrates the inside of the housing 10 having a central rotational rod 1910, which facilitates the rotational motion of the inner generator core (rotor) 620. The one-way wheels 1680 and 1670, supported by rails 2000, causes the generator core (rotor) 620 to accelerate spinning in the preferred direction 660. When the buoy 30 is rising, the left magnets 350 lift rods 60 and weight 1560, which pulls on wire 630, which goes under pulley 1640, and into one-way ratchet 1680, spinning its core, which spins the ratchet 2550, which, in turn, spins rotor 620 in direction 660. At the same time, wire 650 is retracting into one-way ratchet 1670. As a wave causes the buoy 30 to fall, the downward motion of the sliders 50 cause the right slider 50 to pull on wire 650, which goes over pulley 1540, then down to and under pulley 1650, into one-way ratchet 1670 spinning it in direction 660. At the same time, left wire 630 is retracting into one-way ratchet 1680.

Figure 4:
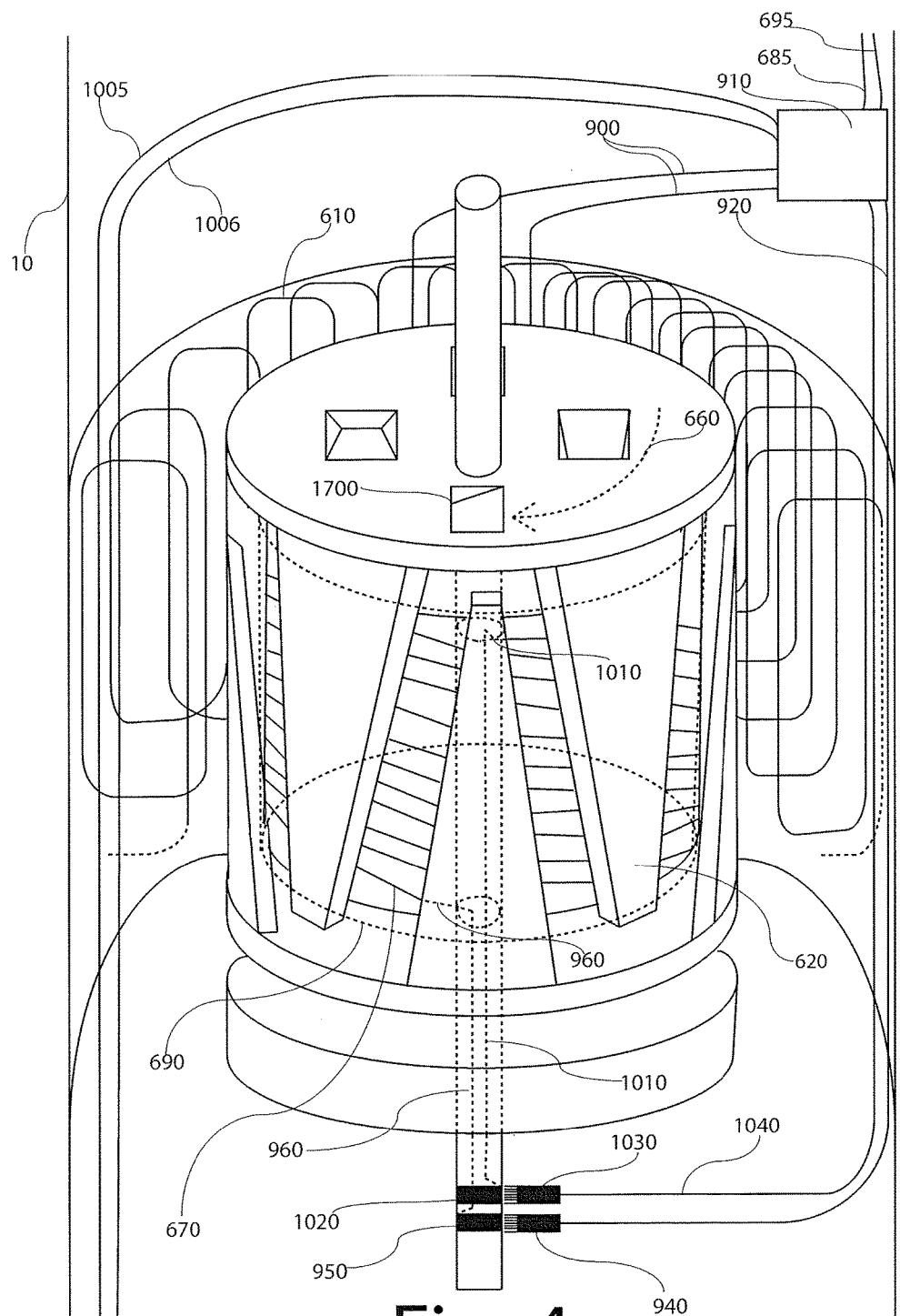
FIG. 4 shows one embodiment of the inner core (rotor) and the copper wires that surround it (stator) which generates electricity as the core spins. The stator that surrounds the rotor and generates the spinning magnetic field which may also be generated by a permanent magnet or both together. Additionally, it shows the carbon brushes, contacts and wires which carry the current from the stator to a box which takes most the AC current out of the development, to the power grid, and converts the rest to DC current which flows to the rotor's electromagnet and any other attached electronics or lights.

One or more coils of electrically conductive wire 610, such as copper, surround the perimeter of the inside of the development 330, forming a stator 610. More detail is provided as depicted in FIG. 4 and discussed below. These coils (stator) 610, generate electricity as the inner core (rotor) 620 spins with the rise and fall of each wave. The rotor 620 consists of a permanent magnet, an electromagnet, or both which generates electricity in the stator 610 as it spins.

Referring to FIG. 4, as discussed above, the top of the inner core (rotor) 620 has one or more notches 1700 which receive ratchet 2550 in FIG. 3, FIG. 7, and FIG. 8 in order to spin. The upward force exerted by waves causes the rotor 620 to spin in the preferred direction 660.

FIGS. 3 and 4 illustrate a first series of coils of electrically conductive wire 610 wrapped around the inner perimeter wall of the housing 10. Wrapped around the inside of the rotor 620 is a second wrapping of electrically conductive wire creating electromagnet 670. The inner core (rotor) acts as an electrical generator as it spins. That is, when spinning, the electrically conductive wire (stator) 610 generates electricity as the rotor 620 spins near the electrically conductive wires of stator 610 surrounding the perimeter of the device housing 10. This motion generates electricity which flows through wires 900 to converter box 910 which sends the majority of electricity as AC along wires 695 to an outlet 1750 (seen in FIG. 5) out to cables 695 (in FIG. 5) for use. The rest of the electricity is converted by box 910 to DC which flows along wires 1005 to a battery 1015 (FIG. 5), back to converter box 910 along wires 1006, then to wires 685 where it powers external cable housings 625 (FIG. 9). DC current is also directed along wires 920 and 1040 to carbon brushes 940 and 1030, which contact rings 950 and 1020 then flows along wires 960 and 1010 to electromagnet 670 where it powers the electromagnet in one embodiment.

Figures 10A, 10B:
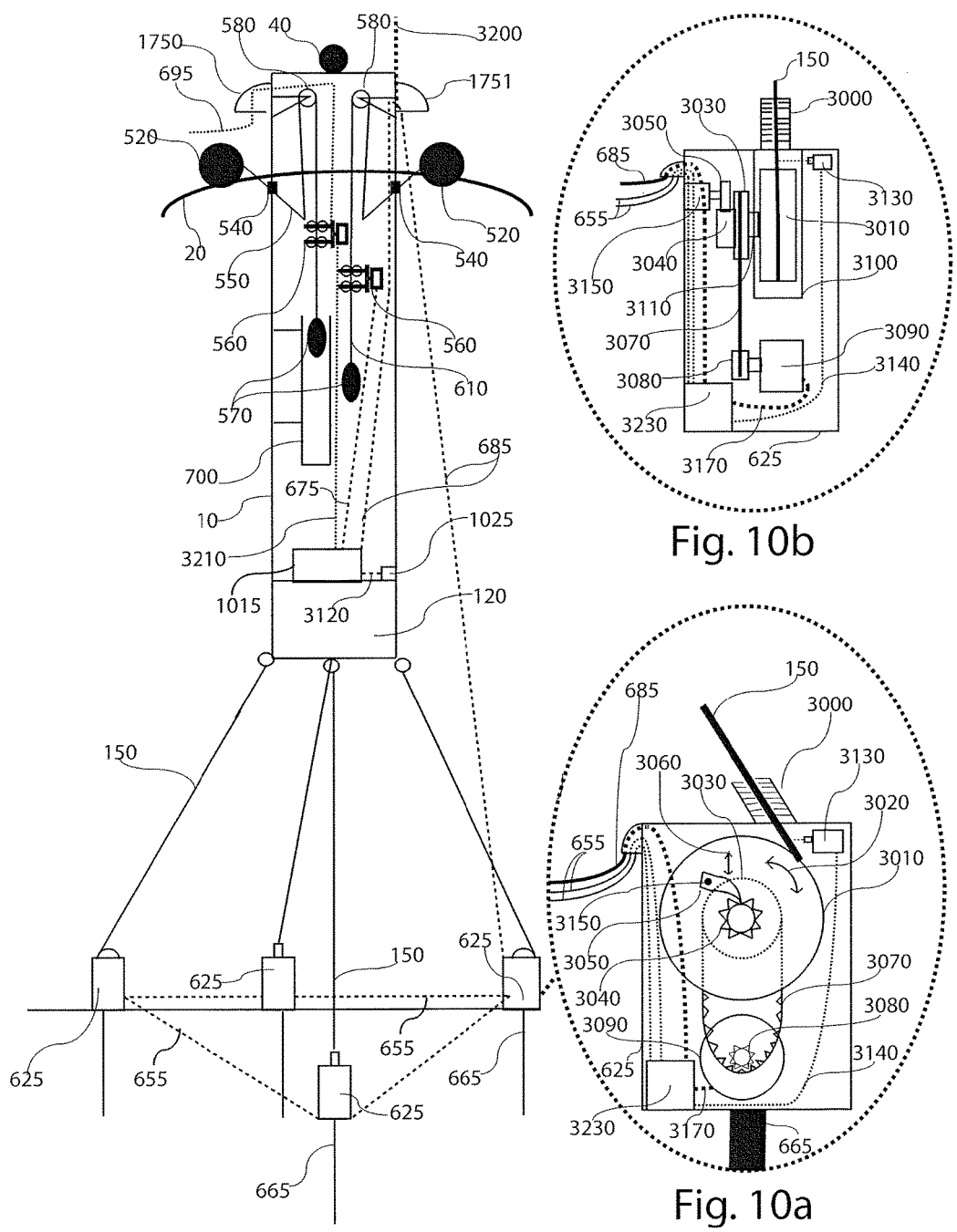
FIGS. 10*a* and 10*b* show one embodiment of a floating cylinder with a plurality of outstretched arms with one or a plurality of arms' generators creating AC current, and one or a plurality of arm's generator creating DC current which is used to charge a battery which powers the water sensor, ship warning light(s), any other onboard electronics, and the cable housings at the bottom of the body of water, and charge each battery contained within the cable housings. Additionally.

In another embodiment, the rotor is powered by an optional permanent magnet 690, and most or all electricity flows by wires 695 out of the device. Some of the current may also be converted to DC by converter box 910 to wires 1005 to charge battery 1015 (FIG. 5) which powers connected sensors 1025, (FIG. 10, 10a) and external cable housings 625 (FIG. 10). In another embodiment, the rotor is a hybrid permanent magnet and electromagnet which appears the same as the first embodiment, and the permanent magnet 690 is beneath electromagnet 670.

Figures 5A, 5B:
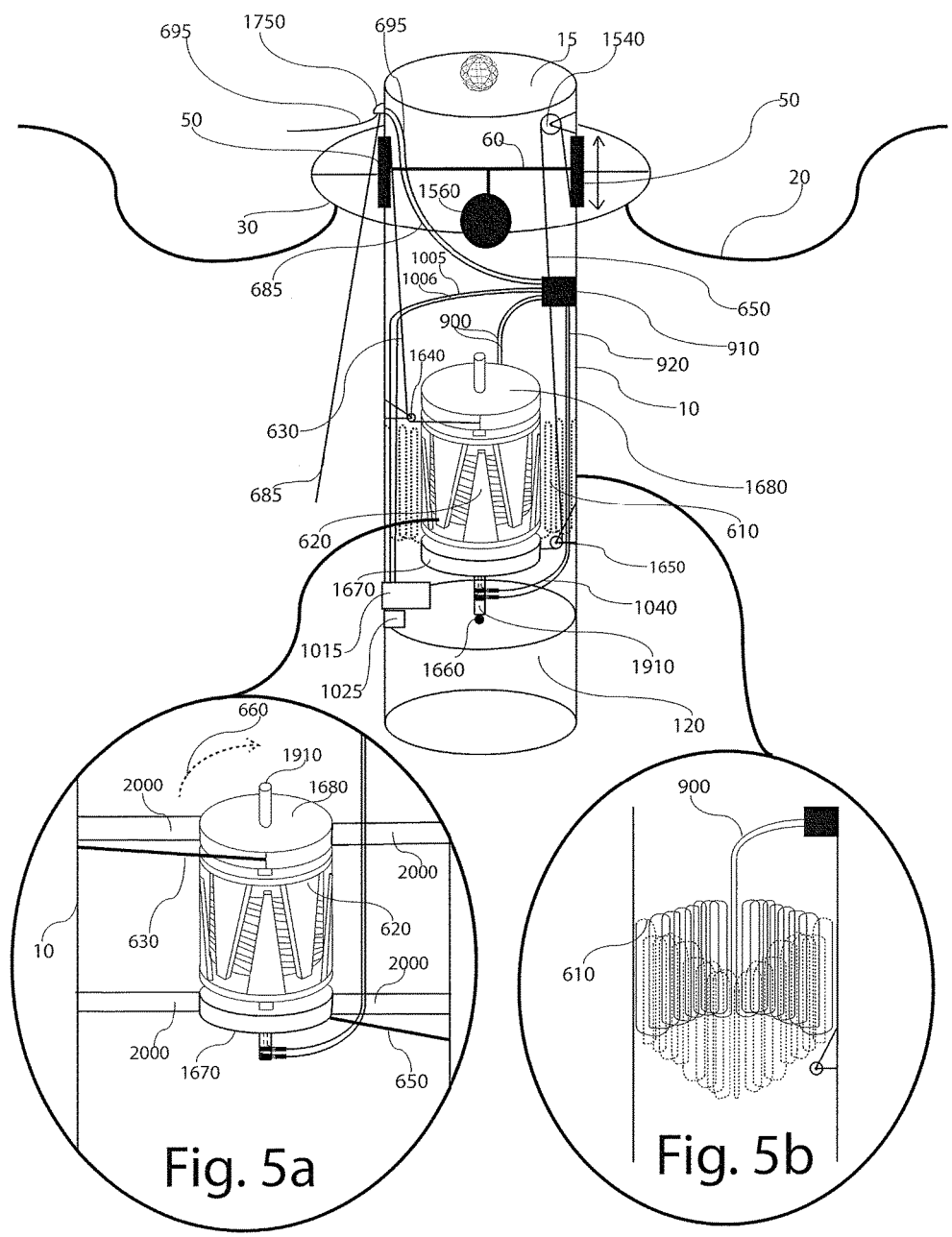
FIGS. 5a and 5b show one embodiment of the pulleys, rotor, stator, and spinning ratchets. The core spins, as cords on either side alternately pull on discs which spin the core, then retract, keeping the core constantly spinning in the same direction and acting both as flywheel and generator and constantly generating electricity regardless of wave direction. Also, it shows wires leading to an onboard battery and water sensor, and leading out of the embodiment, down towards the cable housings (FIG. 10, 10a, 10b).

Turning to FIG. 5, a detailed illustration of the present invention is illustrated using a pulley system for the rotation of inner core (rotor) 620. The rotor simply rotates in one direction like a flywheel, conserving momentum, and thus generating more electricity. The sliders 50, rise and fall with the buoy or float 30 (simplified as a ring in FIG. 5) lifting a plurality of cross bars 60 that support a weight 1560 supported by a plurality of magnets 350 in FIG. 2. The weight 1560 causes gravity to work opposite the rise of the wave so that more energy is transferred to the generator on the backside of the wave. Cord 630 is coupled to a top end of one slider 50 such that the cord is pulled upward as the buoy 30 (and slider 50) travel upward with an incoming wave. Cord 630 travels from the top of the left slider 50, under pulley 1640, to the core of retracting one-way wheel 1680. One-way wheel 1680 is mechanically coupled to the inner core 620 such that rotation of the bottom center of 1680 may cause rotation of the core 620 in a preferred direction 660 with rod 1910 (FIG. 5*a*), supported by a ball bearing 1660 in ballast 120. During the rise of the wave, the upward motion of the slider 50 pulls cord 630 and causes the rotation of the bottom of the upper one-way wheel 1680 in the preferred direction 660 (FIG. 5*a*). This, in turn, causes the rotation of the rotor 620. Once the crest of the wave has passed, the one-way wheel retracts the cord 630 as the tension of cord 630 is reduced and the slider 50 moves downward. Cord 650 is adapted to capture energy on the downside of the wave. As illustrated, it is connected to the bottom portion of a slider 50, preferably (though not exclusively) a slider other than the one coupled to cord 630. It passes upward and over pulley 1540, under pulley 1650 and is coupled to a second one-way wheel 1670. The second one-way wheel 1670 is mechanically coupled to the bottom of rotor 620 such that rotation of the wheel 1670 may cause rotation of the core 620 in a preferred direction 660 spinning rod 1910, supported by ball bearing 1660, and held spinning in place by coils 1680 and 1670, which are held steady by rods 2000 in FIG. 5*a*, connected to the inside of housing 10 and to one-way ratchets 1680 and 1670.

In certain non-limiting embodiments, the first one-way wheel 1680 is present immediately above the inner core 620 and the second one-way wheel 1670 is immediately below the inner core 620. Based on its orientation, and the presence of the weight 1560, the cord 650 pulls on the down stroke of the wave. That is, the movement of the slider 50 downward from its peak causes tension in cord 650, ultimately, pulling on the one-way retracting wheel 1670. This causes continued rotation of the core 620 in the preferred direction 660 (FIG. 5*a*). Once the slider 50 reaches it bottom-most point and as it begins its ascent with a new wave, the second one-way wheel 1670 retracts cord 650 to reset. Further details of the workings of one-way retracting wheels 1680 and 1670 are discussed in FIGS. 6, 7, and 8.

Illustrated in FIG. 4, as with the foregoing embodiments discussed herein, the inside of the core 620 contains a conductive wire coil 670 wrapped around its metal and/or magnetic core 690. Surrounding this rotor is a series of coils 610 (the stator). The core 620 spins and the wires 670 wrapped around the core 690 electromagnetically interact with the coils 610 immediately adjacent to the inner core 620 walls. Back to FIG. 5, this motion generates electricity which flows through wires, 900 to box 910, to wires 695 on the inside of the embodiment, to an outlet, 1750, out to cable 695 outside the embodiment for use. Converter box 910 also directs current to wires 1005 which charge battery 1015 which powers water sensor 1025, and whose power travels back to converter box 910 using wires 1006 and then out of the embodiment using wires 685, where it travels to cable housings 625 (FIG. 9).

FIGS. 6*a*, 6*b*, 6*c*, 7, and 8, illustrate a closer perspective of the inner core 620 and the interaction of the first and second one-way wheels 1680, 1670. The first one-way retractable wheel 1680 is held in place by rods 2000, and optionally others not shown. The second one-way retractable wheel 1670 is held in place by rods 2000, and optionally others not shown.

Figure 6A:
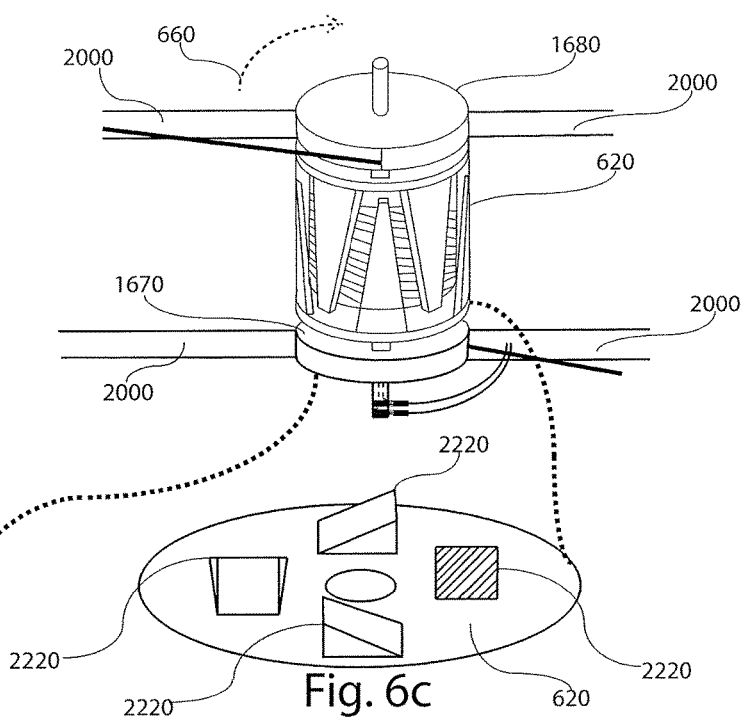
FIGS. 6a, 6b and 6c show one embodiment of the core and the bottom spinning ratchet which spins the core (rotor) in the preferred direction as the cord is pulled when waves fall, then lets go and retracts as the cord retracts.

Referring to FIGS. 6, 6*a*, 6*b*, and 6*c* a closer perspective is provided for a front face of the second one-way wheel 1670, which contacts the inner core 620. More specifically, FIG. 6*a* illustrates the second one-way wheel 1670 and cord 650 going in direction 2260. In this direction, the cord is rewinding after rotation from the fall of a wave. The cord 650 rotates to an inside surface 2270 of the wheel 1670 in direction 2250 and is wound around a center 2251 of the wheel 1670. A plurality of ratchets 2210 recede back into the inside surface 2270 of the wheel 1670 when rewinding and not transferring momentum to the generator/flywheel.

Figure 6B:
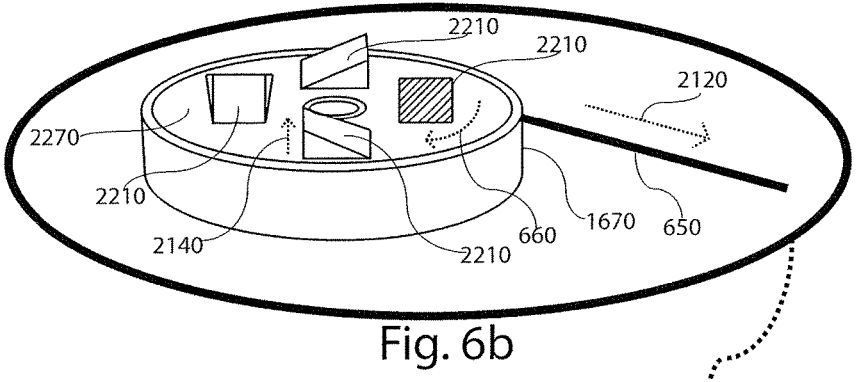

FIG. 6*b* illustrates the second one-way wheel 1670 during the fall of the wave when wheel 1670 is engaged with the inner core 620 and causing its rotation. As illustrated, and discussed above, during this embodiment the cord 650 is pulled in direction 2120. As the cord 650 is pulled, this causes a pull on the center 2270 of the wheel and rotation of the wheel in direction 660. As it rotates, cord 650 is unwound from the wheel 1670 and travels in the direction of arrow 2120. The plurality of ratchets 2210 rise from the wheel in direction 2140, and make contact with the bottom of the generator/flywheel 620, transferring momentum to it as it spins.

Figure 6C:
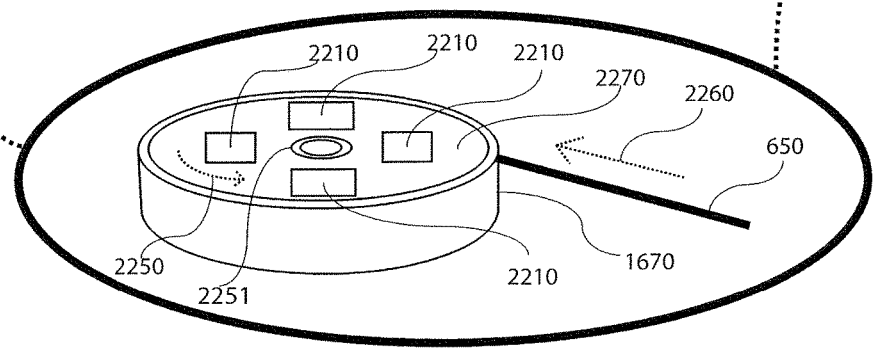

FIG. 6*c* illustrates the bottom of rotor 620 which has recessed areas 2220 which catch the ratchets 2210 as they spin and transfer momentum to the generator/flywheel.

Figures 7A, 7B, 7C:
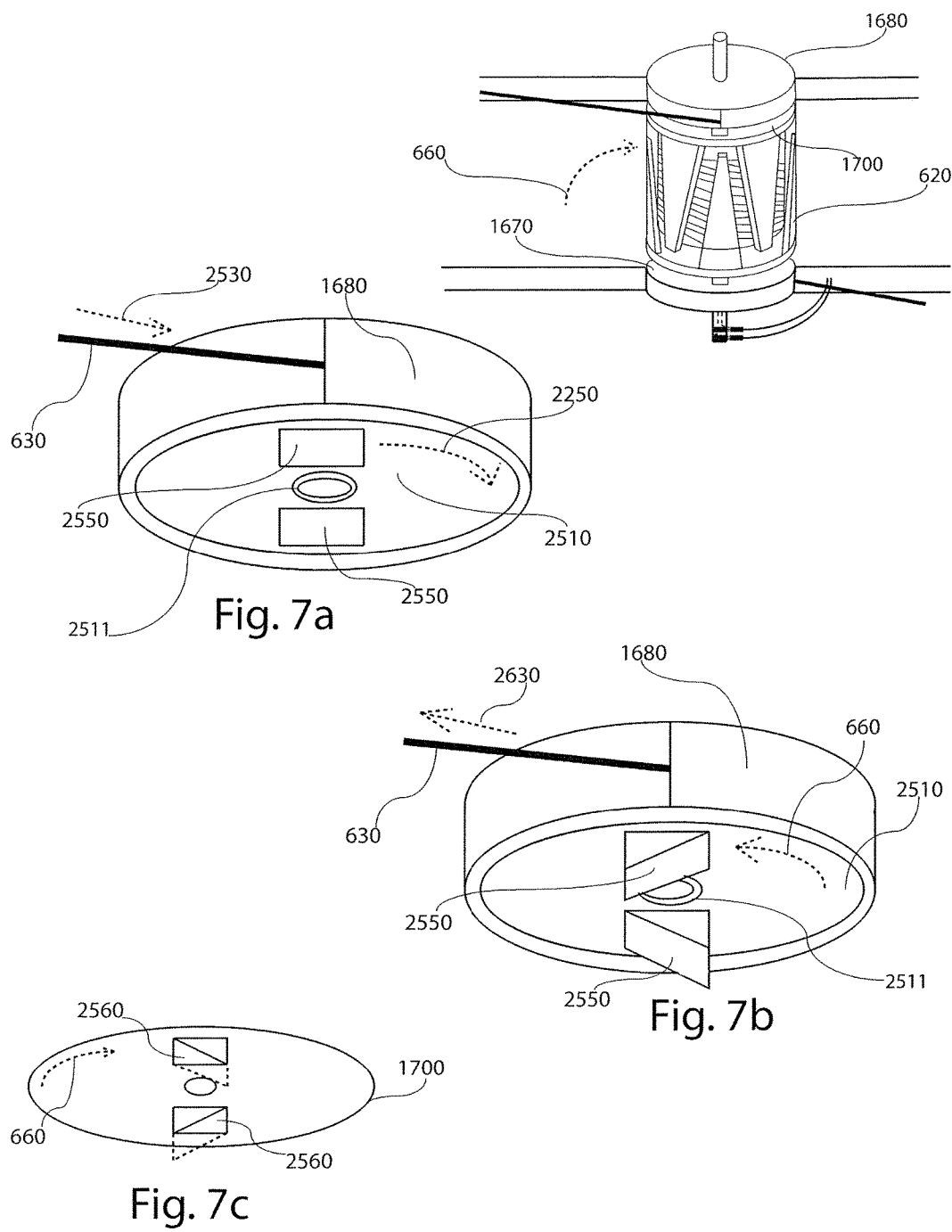
FIGS. 7a, 7b and 7c show one embodiment of the core (rotor) and the top spinning ratchet which spins the core in the preferred direction as the cord is pulled when waves rise, then lets go and retracts as the cord does, keeping the rotor spinning in the preferred direction.

The design of the first one-way wheel 1680 is similar to that of the second one-way wheel 1670, discussed above, and is illustrated in FIGS. 7, 7*a*, 7*b*, and 7*c*. More specifically, FIG. 7*a* illustrates the first one-way wheel 1680 and cord 630 going in direction 2530. In this direction, the cord is rewinding after rotation from the rise of a wave. The cord 630 rotates to an inside surface 2510 of the wheel 1680 in direction 2250 and is wound around a center 2511 of the wheel 1680. A plurality of ratchets 2550 recede back into the inside surface 2510 of the wheel 1680 when rewinding and not transferring momentum to the generator/flywheel.

FIG. 7*b* illustrates the first one-way wheel 1680 during the rise of the wave when wheel 1680 is engaged with the inner core 620 and causing its rotation. As illustrated, and discussed above, during this embodiment the cord 630 is pulled in direction 2630. As the cord 630 is pulled, this causes a pull on the center 2510 of the wheel and rotation of the wheel in direction 660. As it rotates, cord 630 is unwound from the wheel 1680 and travels in the direction of arrow 2630. The plurality of ratchets 2550 rise from the interior side 2510 of wheel 1680, and make contact with the top of the generator/flywheel 1700, transferring momentum to it as it spins. The center 2511 does not rotate, but keeps rod 1910 (FIG. 5*a*) spinning within it. FIG. 7*c* illustrates the top surface 1700 of rotor 620 where ratchets 2550 catch the top of the rotor 620 at recessed areas 2560 as it spins, transferring momentum to the rotor 620.

Figures 8A, 8B, 8C, 8D, 8E, 8F, 8G, 8H, 8I, 8J:
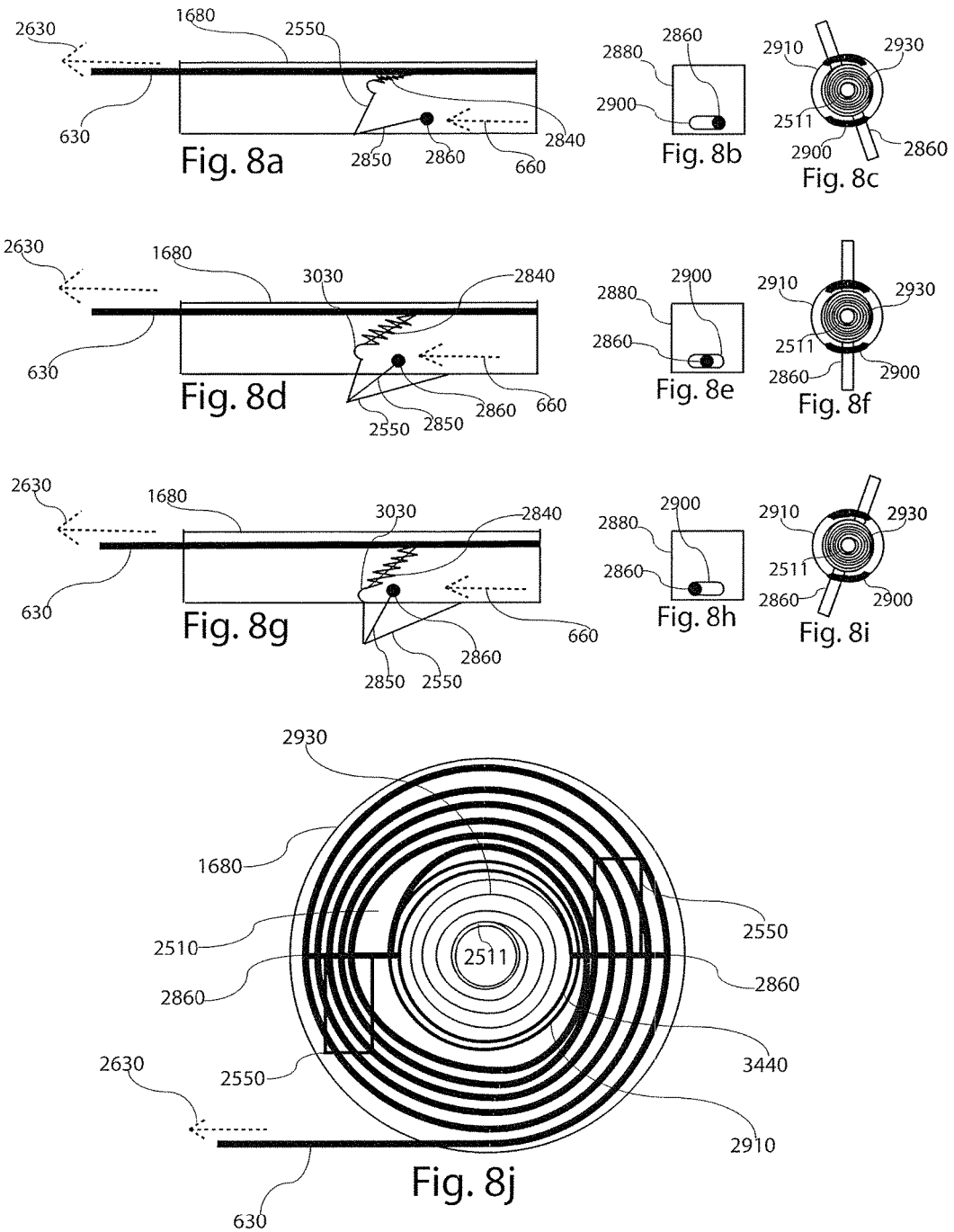
FIGS. 8*a*, 8*b*, 8*c*, 8*d*, 8*e*, 8*f*, 8*g*, 8*h*, 8*i* and 8*j* show one embodiment of the inner workings of the spinning wheels and ratchets that spin the generator core.

FIGS. 8 and 8*a-j* provide perspective of the interior of the first one way wheel 1680, though this illustration is interchangeable with the second one-way wheel 1670 as, in certain aspects, the two wheels function similarly or the same way. FIG. 8*a* illustrates the inner workings of the first one-way retracting wheel 1680 when retracted fully. Cord 630 gets pulled in direction 2630, causing the center of the wheel 2510 (FIG. 8*j*) to spin in direction 660. This causes rod 2860 to push in direction 660, pushing lever 2850 into ratchet 2550 causing it to lower, pulling on spring 2840.

FIG. 8b illustrates the middle core of the first one-way retracting wheel 1680, rod 2860, which is retracted fully, and slot 2900 which the rod slides in to eject/retract the ratchets. FIG. 8c illustrates the middle, 2910, and central (stationary) 2511, cores of the one-way retracting wheel, 1680. The central core 2511 is attached to spring 2930 which is attached to rod 2860. Cord 630 is attached to rod 2860. As the cord pulls on rod 2860, the rod slides through slot 2900, ejecting the ratchet which then engages the recessed portions of the flywheel/generator, causing it to rotate as waves rise and fall.

FIG. 8d illustrates the first one-way wheel 1680 when the cord 630 is pulled further in direction 2630, which causes rod 2860 to rotate in direction 660, pushing on lever 2850, which ejects ratchet 2550, and its curved inner end, 3030, pulling on spring 2840 which will retract the ratchet when the cord later retracts.

FIG. 8e illustrates the middle core of the first one-way wheel in FIG. 8d, where rod 2860, which is sliding in direction 660 to the left as the cord further pulls on it, and it slides through slot 2900. FIG. 8f illustrates the middle 2910 and central stationary 2511 cores of the first one-way retracting wheel 1680 in the embodiment of FIG. 8d. Cord 630 is attached to rod 2860 which slides through slot 2900, further ejecting ratchet 2550. The central stationary core, 2511, is attached to spring 2930 which attaches to rod 2860, causing the ratchet 2550 to extend, and later retract when the cord retracts.

FIG. 8g illustrates the first one-way wheel 1680 where the cord 630 is further pulled in direction 2630. This pulls on rod 2860, rotating it in direction 660. This completely ejects lever 2850 which fully engages ratchet 2550. The ratchet is stopped from going further out by curved piece 3030 which is attached to spring 2840. Now that the ratchet is fully ejected, any further pulling on cord 630 spins the central portion of the one-way wheel 1680 winding its spring the further the cord gets pulled. When the cord 630 retracts, the ratchet 2550 will retract, and the spring will unwind, reeling the cord back in.

FIG. 8h illustrates the middle core of the first one-way wheel 1680 in the embodiment of FIG. 8g. The rod 2860 is now as far as it can go through slot 2900, so now the whole middle core 2510 turns when the rod 2860 and cord are further pulled on. FIG. 8i illustrates, from the embodiment of FIG. 8g, the middle 2910 and central stationary cores 2511 of the one-way wheel 1680. Cord 630 pulls on rod 2860 through slot 2900 until it reaches the end of the slot, and then pushes on and winds up the middle core 2910 using spring 2930. From this point on, all further pulling on the cord winds up the spring 2930 which will then retract when there is slack on the cord 630 and the ratchets 2550 retract before winding the cord back up.

FIG. 8j illustrates a top view of the first one-way wheel 1680. Cord 630 pulls in direction 2630. This pulls on rod 2860 which spins it around the middle hub 3440. Hub 2910 has slot 2900 (FIG. 8i) in it to allow the rod to turn, ejecting ratchets 2550. After the ratchets are ejected, any further pulling on cord 630 spins the central portion, spinning the ratchets 2550, which transfer their momentum to the generator/flywheel in previous illustrations of the second embodiment, and winds spring 2930 attached to central stationary hub 2511.

An alternative embodiment of the present invention is illustrated in FIG. 9. More specifically, FIG. 9 illustrates a floating cylindrical tube 635, although it could be any tubular shape, square, triangular, etc. that floats on the surface of water 20, by floats 605, and contains a buoy 615, attached to a cable or zipline 610. Certain embodiments may have a cable or zipline 610 go through one or more two-way generators 560. A non-limiting example of such a two-way generator is disclosed in U.S. Pat. No. 8,686,583, the contents of which are incorporated by reference in its entirety. The zipline 610 is attached to a mass 570. The generator generates power on both the rise and fall of each wave as it engages one of two one-way ratchets. The tube 635 is attached to the body of water's floor by cables 150, such as those discussed herein which may be modified or provided such that ocean and other life can see and/or avoid them. The cables 150, attach to the tube using any method known in the art or discussed herein. In one such method, the attachment is shown as rings 130, and is attached to the body of water's floor 90 through cable housings 625, which are drilled into the body of water's floor by rods 665, and are networked together by wires 655.

Figures 9A, 9B, 9C:
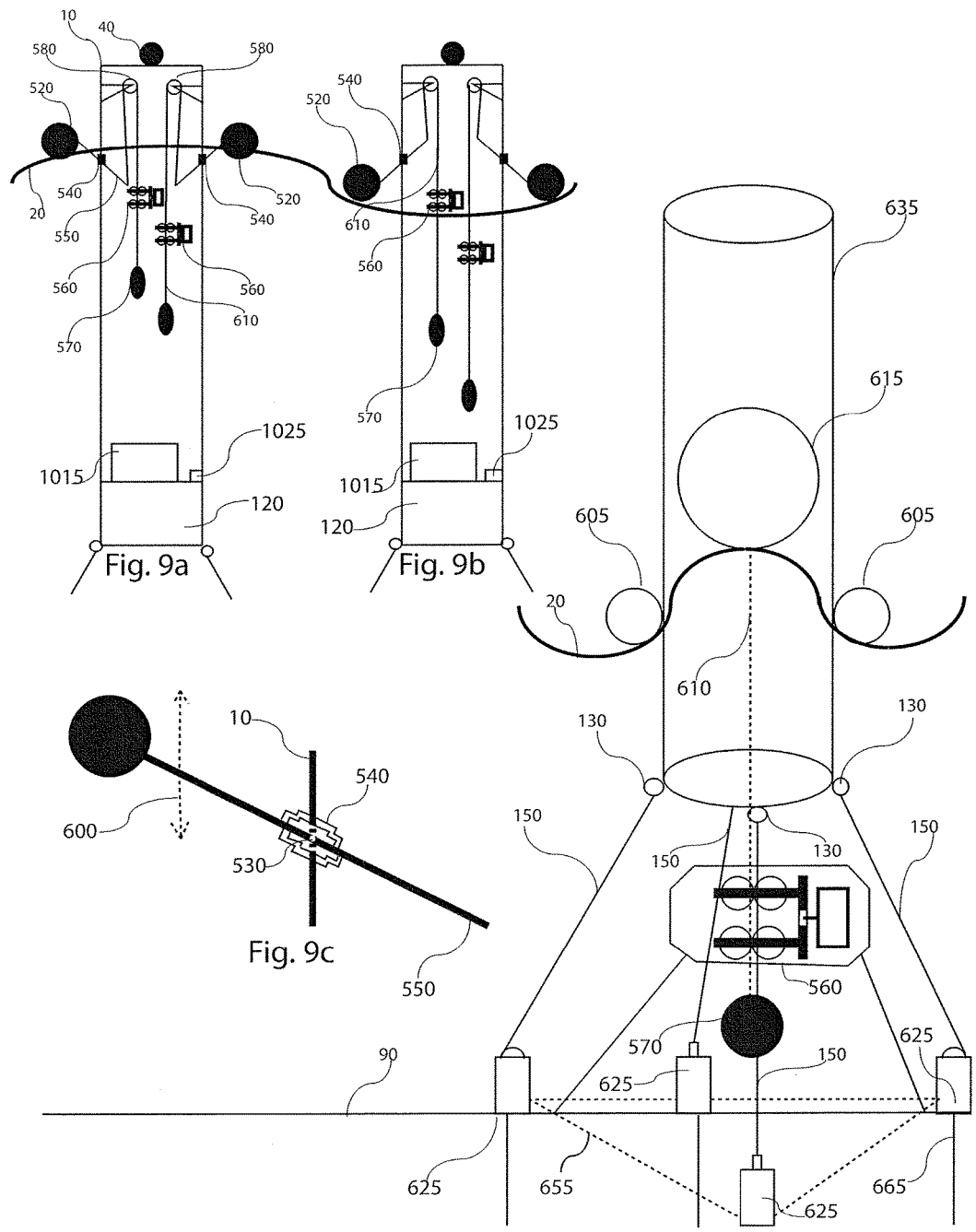
FIGS. 9*a*, 9*b* and 9*c* show one embodiment of a floating cylinder with floats attached, which contains and restrains the lateral movement of a buoy which rises and falls with the waves, spinning a generator. The cylinder is attached to the body of water's floor by a plurality of cables which are shortened or lengthened depending on their tension or by EM signal by housings as the average body of water's level rises as our climate warms. The housings may also release or retract cable to protect the cylinder in FIG. 9, 9*a*, or 9*b* from storms, tidal waves, or other events using algorithms or external commands via EM waves or encrypted EM waves. Additionally.

FIG. 9a illustrates housing 10, having a plurality of buoys 520, connected by rods 550, which pass through watertight gaskets 540, rotating about hinge 530 (FIG. 9c), as it moves in direction 600 (FIG. 9c). Water 20, causes buoy 520 to rise, forcing rod 550 down inside the housing. This pulls on zipline or cable 610, which goes over pulley 580, and down through two-way generator 560, where it is attached to mass 570. The mass 570 was pulled up, turning the top wheels of the two-way generator 560, generating electricity. Ballast 120 keeps the housing upright and submerged, and sensor 1025 detects any water that may leak into the housing 10.

Referring to FIG. 9b, as the wave passes the water 20 falls. Because mass 570 is attached to cable/zipline 610, it forces buoy 520 down, as it pivots on hinge 530 (FIG. 9c) in gasket 540, and causing two-way generator 560 to generate electricity as the bottom two wheels spin, further turning the generator, which never stops spinning, maintaining momentum and generating more electricity.

FIG. 9c illustrates hinge 530, which rod 550 pivots on as it travels in direction 600. One or a plurality of layers of rubber, Kevlar or other material 540 creates a watertight seal about hinge 530 so that water does not enter housing 10.

FIG. 10 illustrates watertight housing 10, containing weight tubes 700, which prevent the weights from smashing into one another or getting tangled as the housing rocks or sways due to a storm or other event. One or more of the plurality of generators 560 will generate DC current which flows by wire 675 to battery and electronics 1015, charging it. Battery and electronics 1015 powers water sensor 1025 through wires 3120 whose data passes back through wires 3120, through battery and electronics 1015 and up to outlet 1751 and antenna 3200 through wires 685. Data can also travel through data cables 3210 to outlet 1750, which attaches to cables 695 back to shore. Battery and electronics 1015 also powers and communicates with the cable housings 625, drilled into the body of water's floor by rods 665. Power is distributed to all other cable housings 625, by cables 655 which also carry data so that the cable housings work in unison, and share data. Cable 695 carries AC power from the plurality of other AC generators 560, to the shore and/or power grid.

FIG. 10a illustrates cable housings 625, drilled into the body of water floor by rod 665. It receives power and information from cable 685, which powers and charges battery and electronic unit 3230 which takes power from cable 685, and information from sensor 3130, by way of wires, fiber optic, or other data cable(s) 3140 which measures the tension on cable 150. With this data, battery and electronic unit 3230 calculates the proper average tension on cable 150 to keep housing 10 at the optimal height to generate the most power, and to release cable in case of emergencies such as storms. Electronic unit 3230 uses data from sensors in all cable housings 625 by way of cables 655, and commands all other cable housings to let out or reel in the same amount of cable to keep housing 10 level. It may also be commanded by EM wave, encrypted EM wave, or data from cable 695 to release or retract cable. Power enters main cable housing 625 by cable 685 which charges electronics and battery 3230, which powers two-way electric motor 3090 using wires 3170, which turns gear 3080 which turns belt 3070, which turns wheel 3030 in direction 3020, turning gear 3040, whose direction is controlled by ratchet 3050 which is raised and lowered by motor 3150 which rotates in directions 3060. Wheel 3030 also turns wheel 3010, which reels in or lets out cable 150 through brushes 3000, which keep sea life from growing on cable 150.

FIG. 10*b* illustrates a side view of cable housings 625. Battery and electronic unit 3230 powers electric motor 3090 using wires 3170 and turns gear 3080, turning belt 3070, which turns gear 3030, which turns gear 3040, which is regulated by ratchet 3050, which is raised and lowered by motor 3150. Gear 3030 also turns cable winch 3010 through a watertight connection 3110 which passes through watertight barrier 3100, keeping water from entering the housing 625. The cable winch 3010 reels in and lets out cable 150 through brushes 3000 which keep sea life from getting a hold on cable 150. Wires 3140 power and receive data from tension sensor 3130 which sends data back to electronic unit 3230 which calculates whether to release or retract cable 150 from all cable housings 625.

While the present invention has been particularly shown and described with reference to certain and preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An apparatus for converting wave energy into electricity, comprising:
    a housing,
    a generator contained within the housing,
    one or more buoys located on the external side of the housing,
    one or more external sliding elements operably coupled to an external housing wall and slidable along at least one portion of the external housing wall, and
    one or more internal sliding elements operably coupled to an internal housing wall and slidable along at least one portion of the internal housing wall,
    wherein:
        the one or more buoys are mounted to the one or more external sliding elements,
        the one or more external sliding elements comprise one or more external magnets and the one or more internal sliding elements comprise one or more internal magnets, wherein the one or more external magnets and the one or more internal magnets have opposite polarity, thereby the one or more external sliding elements and the one or more internal sliding elements are coupled via the magnetic force to slide together along the external and internal housing wall, and
        the one or more internal sliding elements are additionally coupled to at least one cable, wherein the cable is further coupled to the generator by way of a recoil starter mechanism associated with a generator shaft, such that when the cable is pulled by the one or more internal sliding elements, the cable causes the generator to spin, thereby generating electricity.

2. The apparatus of claim 1, wherein the generator comprises:
    a magnet selected from the group consisting of a permanent magnet, an electromagnet, and a combination thereof, and
    a set of electrically conductive wire coils coupled to a peripheral wall of the interior side of the generator, such that when the cable is pulled by the one or more internal sliding elements, the cable causes the magnet to spin and move past the set of wire coils, thereby generating electricity.

3. The apparatus of claim 1, wherein the housing comprises at least one guiding mechanism and any one of ball bearings, wheels, rollers, or a combination thereof, and wherein the one or more external sliding elements slide along the guiding mechanism through any one of the ball bearings, the wheels, the rollers, or a combination thereof.

4. The apparatus of claim 1, wherein the recoil starter mechanism comprises one or more one-way retracting wheels.

* * * * *